Nov. 19, 1929.   L. W. NORTHFIELD ET AL   1,735,973
SCALE CONSTRUCTION
Filed Dec. 19, 1927
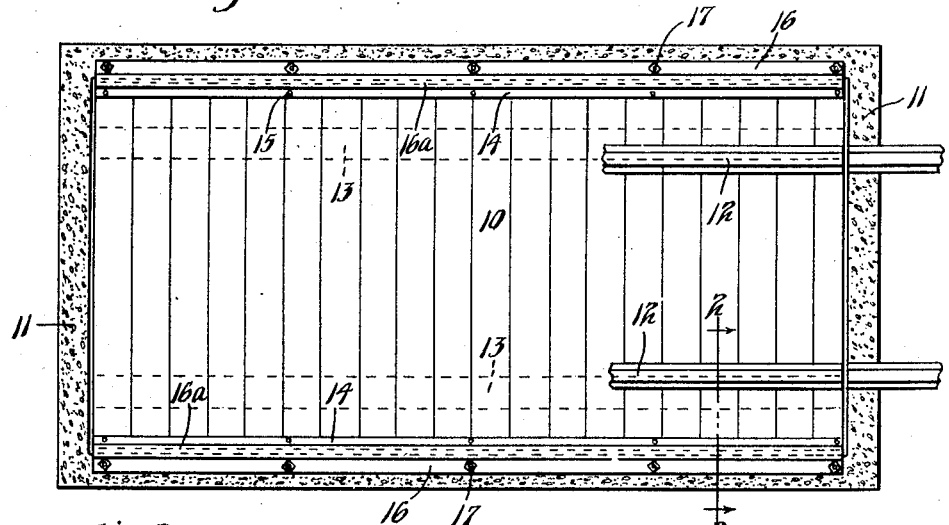
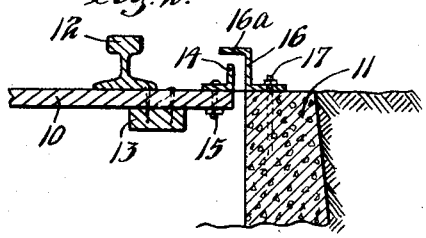 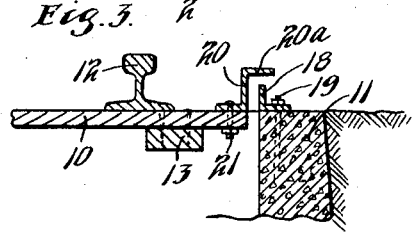
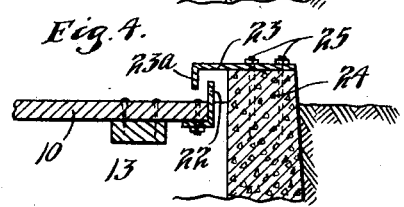 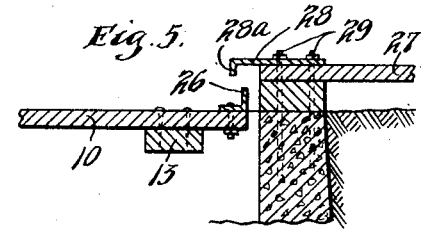
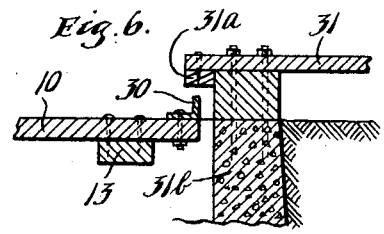 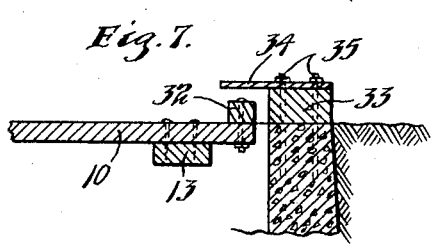
INVENTORS.
LUKE W. NORTHFIELD.
WESLEY A. NORTHFIELD.
GLENN H. NORTHFIELD.
BY THEIR ATTORNEYS.

Patented Nov. 19, 1929

1,735,973

UNITED STATES PATENT OFFICE

LUKE W. NORTHFIELD, WESLEY A. NORTHFIELD, AND GLENN H. NORTHFIELD, OF MINNEAPOLIS, MINNESOTA

SCALE CONSTRUCTION

Application filed December 19, 1927. Serial No. 241,245.

This invention relates to a scale construction, and while it is capable of various applications, it particularly is designed for application to the type of scale having a platform for receiving the load to be weighed, which platform is movable and connected to the weighing mechanism. Such platforms are usually surrounded by a frame which has a horizontal surface adjacent and often slightly above the platform. In weighing various materials such as coal, the material often drops between the edge of the weighing platform and the frame, and interferes with the proper functioning of the scales. It has been heretofore proposed to place a layer of flexible material along the edge of the platform which has usually been connected to the frame, and arranged to overlap the platform. Such material, however, becomes saturated with moisture and in winter is often coated with snow and ice, thus bearing heavily on the platform, and the same often becomes more or less attached to the platform. Such means thus interferes with the proper action of the scales.

It is an object of this invention, therefore, to provide a scale structure comprising a movable platform and frame member, one of which parts has a narrow member extending along the side thereof and the other of which has means overhanging said member, whereby material is prevented from entering between the platform and frame.

It is another object of the invention to provide a scale construction comprising a frame and platform, which platform has extending along its edge and projecting upwardly, a narrow member such as an angle bar, and said frame has secured thereto adjacent the platform and extending therealong, a member overhanging said narrow member, which preferably is also in the shape of an angle bar, whereby material is prevented from entering between said platform and frame.

These and other objects and advantages of the invention will be fully set forth in the following description made in connection with the accompanying drawings, in which like reference characters refer to similar parts throughout the several views and in which:—

Fig. 1 is a plan view of the weighing scale, illustrating the frame and platform thereof;

Fig. 2 is a vertical section taken on line 2—2 of Fig. 1, as indicated by the arrows; and Figs. 3 to 7 inclusive are views similar to Fig. 2, showing modified forms of the construction.

Referring to the drawings, particularly Figs. 1 and 2, a scale construction is shown, comprising a platform 10 which will be vertically movable through a short distance so as to operate the weighing mechanism (not shown). The platform is surrounded by a frame structure 11 which may be made of wood, concrete or other suitable material. The frame 11 as illustrated comprises a wall and surrounds a pit at the top of which platform 10 is disposed, which pit is adapted to receive the weighing mechanism, which supports said platform. While the type of frame 11 may be of various levels, in Fig. 2 the same is shown as being substantially flush with the top of the platform 10. The invention is applicable to scales having platforms adapted to weigh various materials, such as that carried in wagons, or to weigh material carried in cars. In the latter type of scales, the platform is usually provided with a track and such a track is shown in Fig. 1, the rails thereof being designated as 12. The platform 10 is shown as having a timber 13 extending longitudinally thereof on its under surface.

In accordance with the present invention, a member 14 is attached to the edge of the platform 10 by any suitable means, such as the headed and nutted bolts 15. While the member 14 may take various forms, it is illustrated as a narrow member, and in the embodiment of the invention illustrated, in Fig. 2, it is shown as an angle bar 14 having a free vertical side extending upwardly. The member 16 is also attached to the frame member 11 extending longitudinally at the edge thereof and comprising means overlapping the member 14. While the member 16 may also take various forms, it is preferably in the form of a strip and in the embodiment of the invention illustrated in Fig. 2, it is shown as a Z-bar having one side or flange secured to the frame 11 by any suitable means, such as the plates 17 having a vertically extending side and a horizontally projecting side 16$^a$ which extends over the vertically extending side of member 14.

The top of member 14 is spaced below the side 16$^a$ a greater distance than is necessary for the movement of the scales.

In operation the load will be placed on the platform 10 as usual and will be weighed thereon. Any material which may accidentally drop on the frame or platform, however, will be prevented from passing into the space between the platform 10 and frame 11 by the members 14 and 16. These members, however, will not in any way interfere with the operation of the scales and will take up very little room thereon. The proper functioning of the platform and scales is thus assured, no matter how much material is driven on the scales and no matter how much snow and ice is present, as long as the members 14 and 16 are cleared.

In Fig. 3 a slightly modified construction is shown, in which the platform 10 and frame 11 are the same as shown in Fig. 2 but in which an angle bar 18 is shown as secured to the side of frame 11 and extending along the edge thereof. This angle bar is secured by any suitable means such as the bolts 19, and has one side extending vertically substantially flush with the side of frame 11. An angle member 20 is also secured to the platform 10 extending along the edge thereof, and while the same may take various forms, in the embodiment of the invention illustrated it is shown as a Z-bar having a horizontal side secured to the platform 10 by any suitable means such as the bolts 21 having a vertical side extending substantially flush with the edge of the platform and also having a horizontal upper side 20$^a$ projecting outwardly with its terminal edge in position to extend over the vertical side of the angle member 18.

In the operation of the device shown in Fig. 3, the members 18 and 20 will effectively prevent any material dropped about the scale from passing into the space between the same and the frame. Ample movement is provided to accommodate the regular movements of the scale in the weighing operation.

In the embodiment of the invention shown in Fig. 4, an angle member 22 is secured to the edge of the platform 10, extending along the side thereof, said member being in the form of a right-angle bar, the same having one side extending along the bottom of the platform 10 adjacent the edge thereof, said bar having another side extending vertically, having the terminal edge disposed some distance above the top of the platform 10. Another member 23 also of angular shape, is provided, said member having a plate-like portion disposed horizontally and secured to the top of the frame 24 by any suitable means such as the bolts 25. In this modification the frame 24 is shown as disposed some distance above the platform 10. The member 23 has a downwardly extending side 23$^a$ having a depending terminal edge disposed inward of the vertical edge of member 22 and overlapping the same a short distance. The horizontal portion of member 23 thus extends over the top edge of member 22.

In the construction shown in Fig. 4, it will be seen that any material which may fall on the frame or platform will be prevented from falling into the space between the platform and frame.

At the same time, the movement of the platform 10 in the weighing operation is unobstructed and the same will thus not be interfered with or obstructed by any material lodging between the same and the frame.

In Fig. 5 the platform 10 is illustrated as equipped with an angle member 26 quite similar to the angle member 14 shown in Fig. 2. The frame 27 of the scale, however, is shown as disposed some distance above the platform 10 and the same has extending along the edge thereof a flat member 28 secured to the frame by any suitable means such as the bolts 29, said bar having a side 28$^a$ depending substantially at a right angle and having a terminal edge. The terminal edge of the portion 28$^a$ is disposed some distance inward of the vertical side of the angle 26 and disposed some distance above the edge thereof. It will be seen that the members 26 and 28 will effectively prevent any material from entering between the platform and the frame.

The members 26 and 28 also do not in any way interfere with the proper functioning of the platform, and as stated, will effectively prevent any interference by material lodging between the frame and platform.

In Fig. 6 the platform 10 is also shown as provided with an angle member 30 extending along the edge thereof, the same being similar in all respects to the angle member 14 shown in Fig. 2. A frame 31 is provided, and this frame has a projecting portion 31$^a$ extending outward from the side 31$^b$ thereof, which may conveniently be formed of timbers or other material and extends over the vertical side of the bar 30. The projection 31$^a$ is spaced sufficiently from bar 30 to accommodate any necessary movements of the platform 10 and it will be seen that it will effectively prevent the entrance of any material between the edge of the platform 10 and the side of the frame 31.

In Fig. 7 the platform 10 is provided with a strip 32 illustrated as of rectangular shape in cross section and having one side flush with the edge of said platform. A frame 33 which has its top surface some distance above the platform 10 is provided with a plate 34 secured to the frame by any suitable means, such as the bolts 35, said plate having a free edge projecting inwardly from the frame and extending over the member 32. The plate 34 is spaced above the member 32 sufficiently to permit any necessary movement of the platform 10, and members 32 and 34 will effectively prevent the entrance of any material such as lumps of coal, snow, or ice, into the space between the edge of the platform 10 and the side of frame 33.

From the above description it is seen that applicants have provided a very simple and efficient scale construction adapted to prevent interference of the movement of the platform in the weighing operation. Lumps of coal or other material will be prevented from entering the space between the platform and frame and lodging there to interfere with the platform. The means provided will also eliminate any interference with the platform movement by any snow or ice. The edges of the angle bars provided would quickly clear any snow that might possibly find its way into position adjacent the side of the frame. When the snow has once cleared off, therefore, there will be no tendency for the overlapping means provided in the bars to stick or freeze together so as to interfere with the platform movement. The structure provided is quite simple and yet very efficient. The same has been amply demonstrated in actual practice and found to be very successful for the purpose intended.

It will, of course, be understood that various changes may be made in the form, details, arrangement and proportions of the parts, without departing from the scope of applicants' invention, which, generally stated, consists in a device capable of carrying out the objects above set forth, in the novel parts and combinations of parts disclosed and defined in the appended claims.

What is claimed is:—

1. A scale construction having in combination, parts constituting respectively a frame surrounding a pit, a movable platform at the top of said pit adapted to support the load being weighed having an edge spaced from said frame forming a crack, means upstanding from the edge of one of said parts, and means projecting from the edge of the other of said parts for overhanging said first mentioned means, and spaced above the same whereby movement of the platform is permitted and material is prevented from entering the space between the platform and frame.

2. A scale construction comprising parts constituting respectively, a frame and a movable platform adapted to support the load being weighed having an edge spaced from said frame thus forming a crack, and having a pit therebeneath surrounded by said frame and adapted to receive the weighing mechanism, a rigid strip of comparatively narrow material extending along the edge of one of said parts and projecting upward therefrom, and a member secured to the edge of the other of said parts, overhanging said strip and spaced a short distance above the same, whereby movement of said platform is permitted and material is prevented from entering the space between said platform and frame.

3. A scale construction comprising parts constituting respectively, a frame and a movable platform adapted to support the load being weighed having an edge spaced from said frame, said frame forming a pit adapted to receive the weighing and platform supporting mechanism, said platform being at the upper portion of said pit, an angle member secured to the edge of one of said parts and having a free side extending vertically adjacent the edge of said platform, and an angle member secured to the edge of the other of said parts and having a side extending over the angle member on said platform and spaced a slight distance vertically therefrom.

4. The structure set forth in claim 3, said last mentioned member having a depending side with a free terminal edge depending therefrom, and disposed in a plane inwardly of the side of said angle secured to said platform.

5. A scale construction having in combination, a frame comprising a wall surrounding a pit, a weighing platform disposed within said wall and spaced slightly therefrom, the top of said platform and frame being in substantially the same plane and thus having a crack therebetween, a member carried by said platform at each side edge thereof and extending vertically a short distance substantially flush with said edge, a member secured to said frame at each side edge thereof and extending over the top of said first mentioned member and spaced thereabove.

In testimony whereof we affix our signatures.

LUKE W. NORTHFIELD.
WESLEY A. NORTHFIELD.
GLENN H. NORTHFIELD.